June 9, 1942.        T. W. PEDERSEN        2,285,609
METHOD OF MAKING BOMB BURSTER TUBES
Filed Sept. 26, 1941
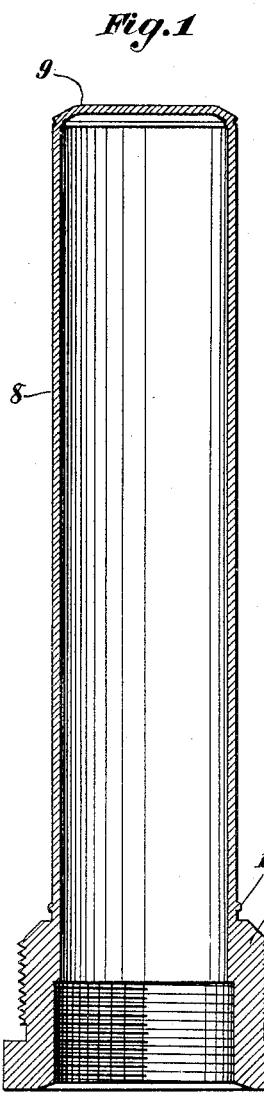
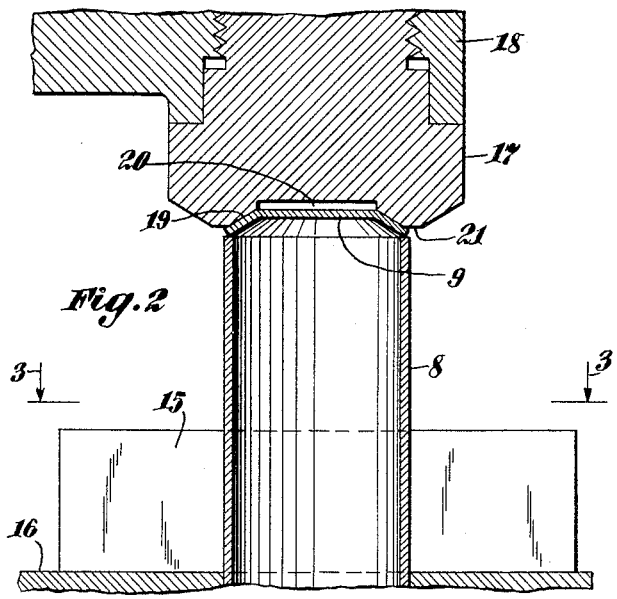
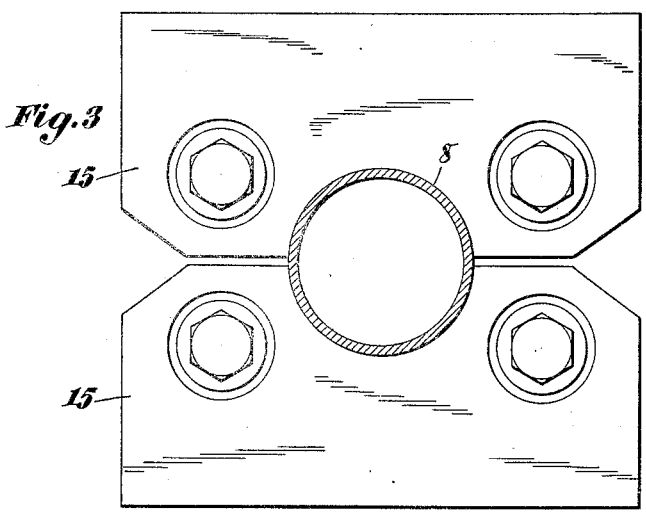
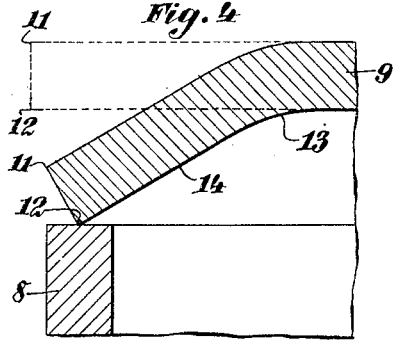
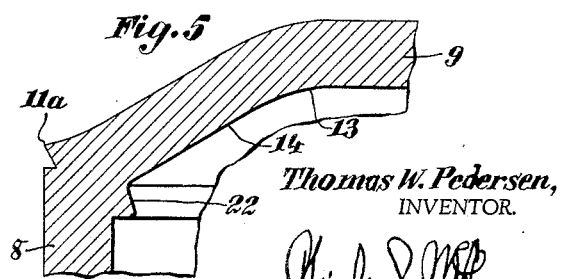
Thomas W. Pedersen,
INVENTOR.
ATTORNEY.

Patented June 9, 1942

2,285,609

UNITED STATES PATENT OFFICE 2,285,609

METHOD OF MAKING BOMB BURSTER TUBES

Thomas W. Pedersen, Montclair, N. J., assignor to The Oiljak Manufacturing Company, Inc., Montclair, N. J., a corporation of New Jersey Application September 26, 1941, Serial No. 412,391

1 Claim. (Cl. 219—10)

The invention here disclosed relates to a method of making bomb burster tubes and other tubular structures requiring pressure tight end closure.

Special objects of the invention are to provide a method of making a bomb burster tube of a form that can be manufactured rapidly and inexpensively from normally available materials and with simple ordinarily obtainable equipment.

Other objects of the invention are to enable the pressure tight closing of thin walled tubular structures and to accomplish this simply and expeditiously, without any increase in the outside diameter of the finished piece.

Further objects and the novel features of invention by which all purposes of the invention are attained will appear and are set forth in the course of the following specification.

The drawing accompanying and forming part of the specification illustrates by way of example one finished product and details leading up to its completion. It will be understood however, that structural and other details may be modified and changed as regards this particular disclosure, all within the true intent and broad scope of the invention as hereinafter defined and claimed.

In the drawing, Fig. 1 is a longitudinal sectional view of a bomb burster tube manufactured in accordance with and embodying features of the invention.

Fig. 2 is a broken sectional detail illustrating a combination of electrodes that may be employed in welding the end closure to the tubular element.

Fig. 3 is a cross-sectional view as on line 3—3 of Fig. 2, showing particularly the complemental jaws of the lower electrode.

Figs. 4 and 5 are enlarged broken sectional details of the end cap before and after formation and connection with the tubular element.

Fig. 1 illustrates a bomb burster tube which is of typical design, so far as the screw-threaded base ring 7, and tubular body 8, are concerned, but which is of special construction and mode of production as regards such tubular portion and its end closure 9.

Heretofore the entire tubular portion, including comparable parts 8 and 9, has been produced by a series of drawing operations from flat stock in a single unitary shell having integral side wall and end closure portions and such one piece shell has then been connected with the base ring by a projection weld, such as indicated at 10.

Such methods of production have been slow and expensive, requiring heavy presses for the deep drawing operations.

In the present invention, the tubular portion 8, is a thin walled length of tubing, either of seamed or drawn seamless formation and the end closure 9, is a separately formed cap specially formed and projection welded to the end of the tubing.

In the enlarged view, Fig. 4, the end cap 9, is struck out of sheet metal, to provide in the initial flat form the sharply angled upper and lower corner edges 11, 12.

The flat disc is then cupped or dished by bending the peripheral portion at 13, to incline the entire perimeter as an angularly projecting flange 14, and thus to deflect the lower or inner corner edge 12, into the position of a sharply bevelled ridge.

The diameter of the disc is enough greater than the outside diameter of the tube and the angle of bend is such as to locate the projecting or offset ridge 12, substantially midway of the tubular wall and the outer edge 11 approximately in line with the outside diameter of the tube.

The inclining of the rim portion of the initially flat disc provides an ideal edge for projection welding and a structure which can be handled according to known projection welding methods.

Figs. 2 and 3 show how the weld can be made in a typical welding press, with the tubular member held by the complemental jaws 15, 15, constituting the lower electrode and mounted on the bed 16, of the machine and the cap engaged by an upper electrode 17, carried by the movable head or ram 18, of the machine.

With a two or three part electrode substantially completely surrounding the object, thin walled tubing can be gripped firmly enough to insure substantially uniform current distribution without bending or deforming the tubing. This is important because of the fact that the projection edge of the cap should meet the approximate center of the wall of the tubing.

The upper electrode is specially constructed to concentrate current flow at the lower, projection edge and to leave the upper, outer edge of the cap relatively cool.

For such purposes, the electrode 17 is shown as having an annular bevelled face 19, to substantially fit the inclination of the flanged rim portion of the cap and a recessed central circular portion 20, to clear the central top portion of the cap. The lower outer edge of the bevelled contact track 19, is shown terminating at 21, substantially at or clear of the upper corner edge 11 of the cap. The latter edge being uncovered by the electrode can remain comparatively cool and thus retain the original external diameter of the cap, in the completed weld, substantially as indicated at 11a, in Fig. 5.

Any upset resulting from displacement of the plastic metal therefore, takes place to the inside, producing usually an internal shoulder, such as represented at 22, in Fig. 5, and which is not objectionable in this particular article or in any other articles where inside dimensions at the closed end are not important and where the main requirement is that the external diameter shall remain the same or substantially so.

The dishing or crowning of the caps in addition to providing a desirable projection welding edge, stiffens the cap structure and gives it a shape which seats and more or less automatically centers in the welding electrode, thus contributing to the accurate centering of the closure on the thin walled tubing.

The cap and tubing may be of the same or of different thicknesses, but in either case, it has been found desirable to center the projection edge of the cap on the mid section of the wall thickness of the tubing. The construction enables strong, continuous and substantially uniform pressure tight and vacuum tight welds to be rapidly produced.

After the end cap is welded to the tubing, the tubing can be welded to the base ring or, if found desirable, both welds, that is, at the end cap and at the base ring, can be produced at the same time and in the same machine.

While particularly adapted for rapid production of bomb bursting tubes, it can be seen that the invention is useful for many other tubular products. The end of the tubing is shown as faced at a right angle to the axis of the tubing, but it is contemplated that this end surface may be at some incline and may have a concave or convex face. While illustrated as circular, it will be realized that the shape of the closure may vary to match the shape of the tubing.

What is claimed is:

The method of manufacturing a bomb bursting tube or the like, from thin walled open-ended tubing, comprising forming a flat sheet metal closure disc of greater diameter than the outside diameter of said tubing, dishing said disc by bending the rim portion of the disc at an incline to the original plane of the disc sufficiently to reduce the outside diameter of the disc to substantially the outside diameter of the tubing and thereby projecting the corner edge which is at the inside of the dished disc to an extent where it will meet the end of the tubing, substantially midway of the wall thickness of the tubing, locating the dished disc over the end of the tubing with the projected corner edge engaged with the mid-portion of the wall of the tubing and resistance welding said angled and projected corner edge of said disc to said mid-portion of the tubing wall under pressure but without flattening down the dished disc and so as thus to retain the diameter of the disc reduced to that of the tubing, in the completed welded structure.

THOMAS W. PEDERSEN.